United States Patent
Schlosser

(12) 
(10) Patent No.: US 6,257,130 B1
(45) Date of Patent: Jul. 10, 2001

(54) DUCTED SMOKER FOR BARBECUE GRILL

(75) Inventor: Erich J. Schlosser, Barrington, IL (US)

(73) Assignee: Weber-Stephen Products Co., Palatine, IL (US)

( * ) Notice: Subject to any disclaimer, the term of this patent is extended or adjusted under 35 U.S.C. 154(b) by 0 days.

(21) Appl. No.: 09/637,718

(22) Filed: Aug. 11, 2000

(51) Int. Cl.$^7$ ............................... A23L 1/00; A47J 37/00; F24C 3/00; F24C 3/04
(52) U.S. Cl. .................................. 99/482; 99/337; 99/340; 99/385; 99/400; 99/422; 99/450; 126/25 R; 126/41 R
(58) Field of Search ............................. 99/331–333, 337, 99/338, 340, 339, 385–393, 400, 401, 422–425, 444–450, 481, 482; 126/25 R, 9 R, 41 R, 540, 541

(56) References Cited

U.S. PATENT DOCUMENTS

| | | |
|---|---|---|
| D. 312,560 | 12/1990 | Williamson . |
| 597,535 | 1/1898 | Bliss . |
| 822,921 | 6/1906 | Chatfield . |
| 1,118,501 | 11/1914 | Laughlin . |
| 1,779,453 | 10/1930 | Taylor . |
| 3,002,444 | 10/1961 | Hoebing . |
| 3,081,692 | 3/1963 | Sorensen . |
| 3,224,357 | 12/1965 | Rubens . |
| 3,583,307 * | 6/1971 | Lee, Sr. .............................. 99/446 X |
| 3,586,518 | 6/1971 | Folmar . |
| 3,611,911 | 10/1971 | Martin . |
| 3,651,596 | 3/1972 | Orsing . |
| 3,693,534 | 9/1972 | Martin . |
| 3,713,579 | 1/1973 | Chaffers . |
| 3,809,056 | 5/1974 | Snelling . |
| 3,858,755 | 1/1975 | Tellen . |
| 4,130,052 | 12/1978 | Jacobson . |
| 4,140,049 | 2/1979 | Stewart . |
| 4,163,503 | 8/1979 | McKinnon . |
| 4,175,691 | 11/1979 | Cornell et al. . |
| 4,190,677 | 2/1980 | Robins . |
| 4,201,125 | 5/1980 | Ellis . |
| 4,374,489 | 2/1983 | Robbins . |
| 4,420,493 * | 12/1983 | Greck ................................. 99/419 X |
| 4,450,759 * | 5/1984 | Steibel .............................. 99/426 X |
| 4,467,709 | 8/1984 | Anstedt . |
| 4,471,757 | 9/1984 | Rogers . |
| 4,495,860 | 1/1985 | Hitch et al. . |
| 4,512,249 | 4/1985 | Mentzel . |
| 4,665,891 | 5/1987 | Nemec et al. . |
| 4,677,964 | 7/1987 | Lohmeyer et al. . |
| 4,690,125 | 9/1987 | Beller . |
| 4,697,506 | 10/1987 | Ducate, Jr. . |
| 4,700,618 | 10/1987 | Cox, Jr. . |
| 4,721,037 | 1/1988 | Blosnich . |
| 4,770,157 | 9/1988 | Shepherd et al. . |
| 4,770,339 | 9/1988 | Weimer . |
| 4,773,319 | 9/1988 | Holland . |

(List continued on next page.)

Primary Examiner—Timothy F. Simone
(74) Attorney, Agent, or Firm—Wallenstein & Wagner

(57) ABSTRACT

A smoker attachment for heating and burning smoker particles in a barbecue grill, and further for dispersing the produced smoke throughout the grilling chamber of the grill. The smoker attachment includes a container having a bottom wall and a plurality of side walls defining an interior cavity. The smoker particles are heated in the interior cavity of the container. The smoker attachment further includes a duct member having an outer wall and a passageway extending through the duct member, and a plurality of openings about a length of the duct extending from the passageway through the outer wall. The passageway of the duct member associates with the interior cavity of the container to allow smoke produced in the container to flow out of the container, into the passageway of the duct member, and to exit the duct through the openings and into the chamber of the grill.

24 Claims, 3 Drawing Sheets

U.S. PATENT DOCUMENTS

| | | |
|---|---|---|
| 4,777,927 | 10/1988 | Stephen et al. . |
| 4,823,684 | 4/1989 | Traeger et al. . |
| 4,830,189 | 5/1989 | Jones . |
| 4,850,333 | 7/1989 | Dellrud et al. . |
| 4,945,824 * | 8/1990 | Borgmann ................................ 99/403 |
| 5,097,817 | 3/1992 | Dodgen . |
| 5,167,183 | 12/1992 | Schlosser et al. . |
| 5,431,092 * | 7/1995 | Guillory ................................. 99/410 |
| 5,535,941 | 7/1996 | Garza . |
| 5,575,198 * | 11/1996 | Lowery ................................. 99/426 |
| 5,586,489 * | 12/1996 | Fraga ................................. 99/421 H |
| 5,662,028 * | 9/1997 | Fraga ..................................... 99/448 |
| 5,665,258 * | 9/1997 | Hsu ..................................... 99/421 P |
| 5,673,611 * | 10/1997 | Tieman ............................. 99/449 X |
| 5,765,469 | 6/1998 | Schlosser et al. . |
| 5,813,321 * | 9/1998 | Bourgeois ............................. 99/340 |
| 5,934,183 | 8/1999 | Schlosser et al. . |
| 5,970,852 * | 10/1999 | Bourgeois ............................. 99/340 |
| 6,102,028 | 8/2000 | Schlosser et al. . |

* cited by examiner

DUCTED SMOKER FOR BARBECUE GRILL

TECHNICAL FIELD

The present invention relates generally to outdoor cooking devices and, more particularly, to a smoker assembly for gas grills.

BACKGROUND OF THE INVENTION

Barbecue grills have become increasingly popular in recent years because of the interest in outdoor cooking. Conventionally, gas grills include a burner assembly adjacent the lower portion of a firebox with a cooking grid supported along the upper edge and lava rock located between the cooking grid and the burner assembly. The lava rock, acting as a form of a conductive member, absorbs the heat from the burning gas and provides a generally uniform heat-producing means for the food being cooked. Grease and other combustible particles, however, build up on the lava rock and cause undesirable flare ups and hot spots within the grilling cavity.

Accordingly, the Assignee of the present invention previously developed a gas grill which eliminates the need for lava rock. Such a grill is disclosed in U.S. Pat. Nos. 4,677,964; 5,765,469; and, 5,934,183. The gas grills disclosed therein have revolutionized the gas grill industry by eliminating the need for the lava rock, which often caused flare-ups and which had to be replaced periodically due to degradation. The gas grills disclosed in the above noted patents utilize sear bars which are positioned between the cooking grid and the gas burners to vaporize any greases that emanate from the food being cooked. Accordingly, the food is cooked utilizing a generally indirect grilling method which substantially eliminates flare ups and provides for an initial searing of the outside of the food.

Following the remarkable degree of consumer acceptance for the commercial embodiment of the invention recited in the above noted patents, the Assignee developed a variety of accessories for such grill, including a smoker assembly which is described in U.S. Pat. No. 5,167,183 and is similarly assigned to the Assignee of the present invention. The smoker assembly of the '183 patent comprises a generally rectangular housing having a bottom wall made of a perforated metal material. The smoker housing is situated on the apexes of the sear bars of the barbecue grill. As such, the heat for igniting the wood chips in the smoker assembly is generated substantially by convection means through the perforations in the smoker housing assembly. Accordingly, it often takes a longer period of time than desired to adequately heat the wood chips to produce the necessary smoke.

Subsequently, the Assignee developed an improved smoker assembly which is described in commonly assigned U.S. Pat. No. 6,102,028. The smoker assembly of the '028 patent includes a smoker container having a plurality of sides and a bottom defining a cavity of the container. The bottom of the smoker container has at least one opening to allow a portion of the sear bars of the grill to pass through the opening in the container and to be positioned within the cavity of the container to more efficiently heat the smoker particles via conductive means.

Both of the above-described smoker assemblies, as well as other prior art devices, however, do not have an effective means for distributing the generated smoke throughout the entirety of the grill. To date, all smoker assemblies merely provide for the smoke to emanate from the smoker container itself, instead of distributing the smoke throughout the entirety of the grill cavity.

Accordingly, there is a need for an inexpensive and effective smoker assembly for a barbecue grill that heats up the chips located therein more quickly and efficiently, and that distributes the smoke throughout the entire grilling chamber.

SUMMARY OF THE INVENTION

The smoker assembly of the present invention provides a removable assembly for a barbecue grill for heating and burning smoker particles, and further for evenly dispersing the resultant smoke throughout the entirety of the grilling chamber to produce flavored smoke in the barbecue grill. Generally, the barbecue grill utilized in conjunction with the smoker attachment includes a bottom chamber having a cooking grid, a burner assembly, and a conductive member between the burner assembly and the cooking grid. The smoker attachment of the present invention includes a container adapted to contain smoker particles in an interior cavity of the container, and a duct member associating with the interior cavity of the container.

According to one aspect of the present invention, the container is located adjacent the heat source, and has a bottom wall and a plurality of side walls defining the interior cavity of the container. The duct member of the smoker attachment associates with the interior cavity of the container and has a passageway extending from a first end of the duct member to allow smoke produced in the container to flow out of the container and into the passageway of the duct member. The passageway provides a gaseous path from the cavity of the receptacle through the interior of the duct member.

According to another aspect of the present invention, the smoker further comprises a second duct member having a passageway extending from a first end thereof. The second duct member similarly associates with the interior cavity of the container to allow smoke produced in the container to flow out of the container and into the passageway of the second duct member.

According to another aspect of the present invention, the duct members have a plurality of openings about their length. The openings extend from the interior of the duct members through to an exterior thereof, such that the gaseous path from the cavity of the container continues through the passageway and out of the openings in the duct members.

According to another aspect of the present invention, the duct members comprise an upper member having an apex. The upper member is adapted to shield the duct openings from food drippings.

According to another aspect of the present invention, the duct members are positioned transverse to the container and include a duct-stop adjacent a first end of the duct member. The duct-stop positions the duct member relative to the side wall of the container.

According to another aspect of the present invention, the smoker attachment further comprises a lid for the container. The lid provides access to the cavity of the container when in an open position to allow for replenishing the quantity of smoker particles in the container.

According to yet another aspect of the present invention, the container of the smoker assembly is adjacent a selected one of the plurality of burners in the bottom chamber of the barbecue grill. As such, the smoker assembly can be selectively heated by independent control of the selected one of the plurality of burners of the grill.

Accordingly, a smoker attachment made in accordance with the present invention provides an inexpensive and easily manufactured assembly which eliminates the drawbacks of prior smoker assemblies.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION OF THE PREFERRED EMBODIMENT

Figure 1:
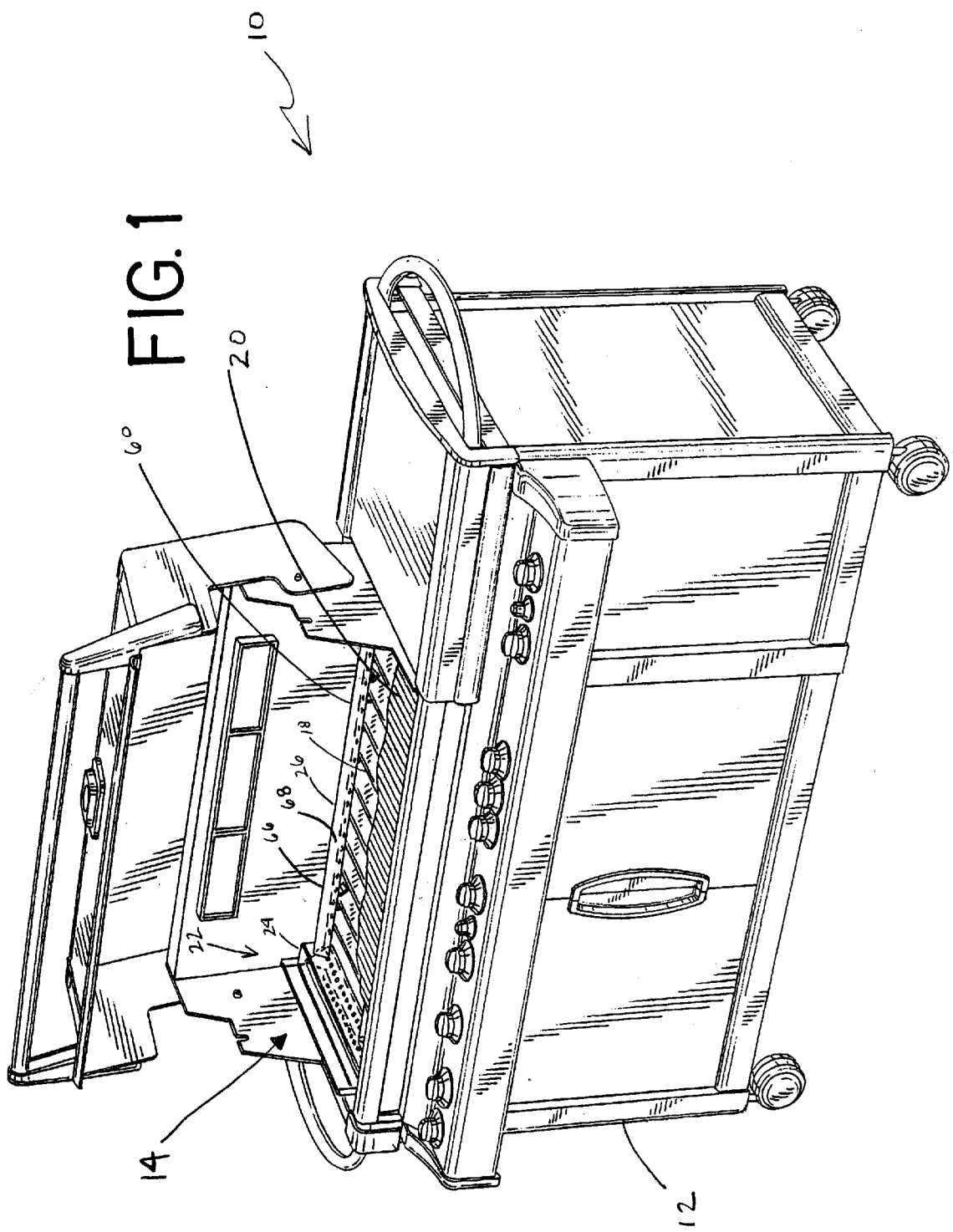
FIG. 1 is a perspective view of a barbecue grill having a ducted smoker attachment of the present invention.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

Figure 2:
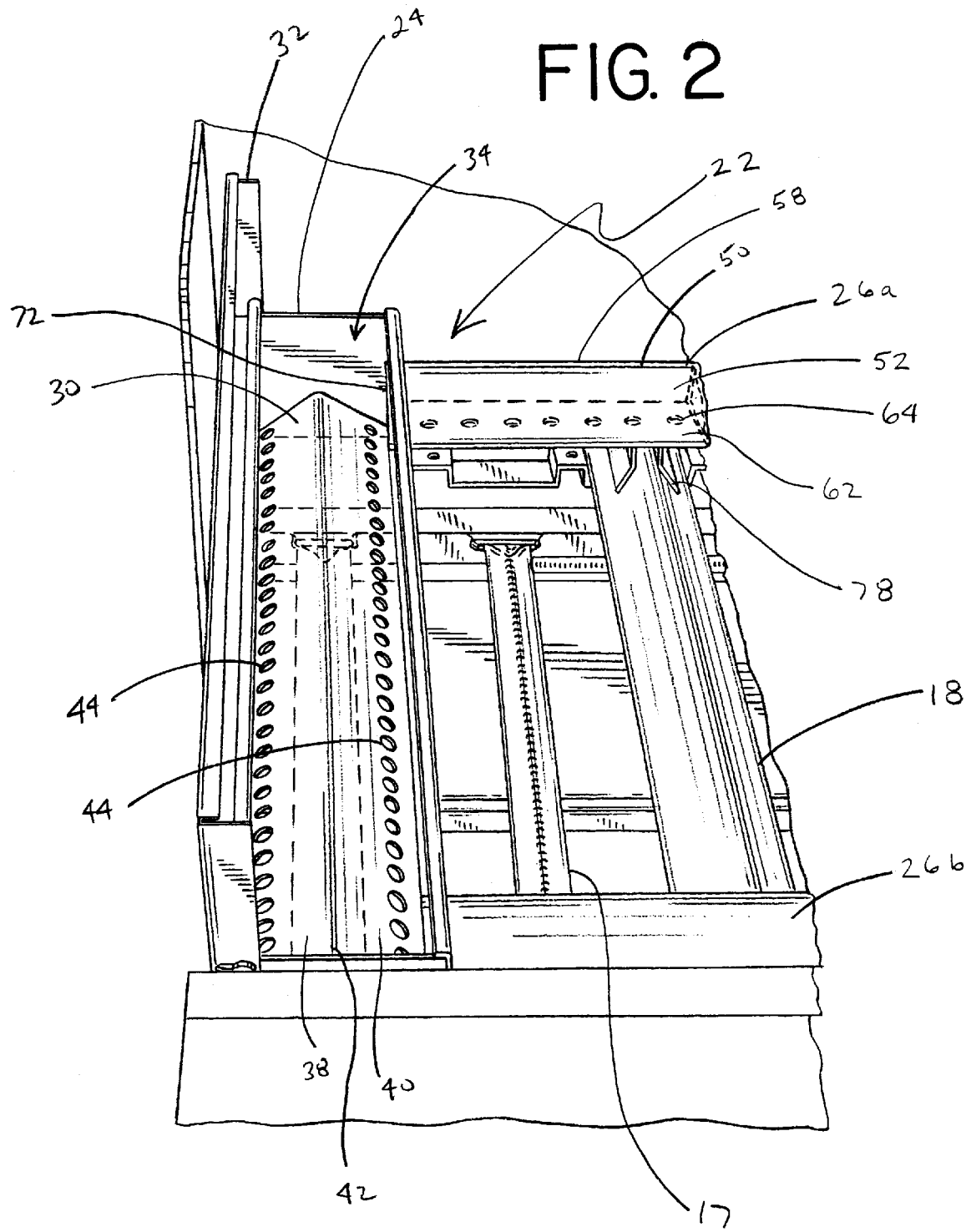
FIG. 2 is a perspective view of the ducted smoker attachment of FIG. 1, shown with a partial cross-sectioned duct; and, FIG. 3 is a front cross-sectional elevation view of the ducted smoker attachment of FIG. 1.
Figure 3:
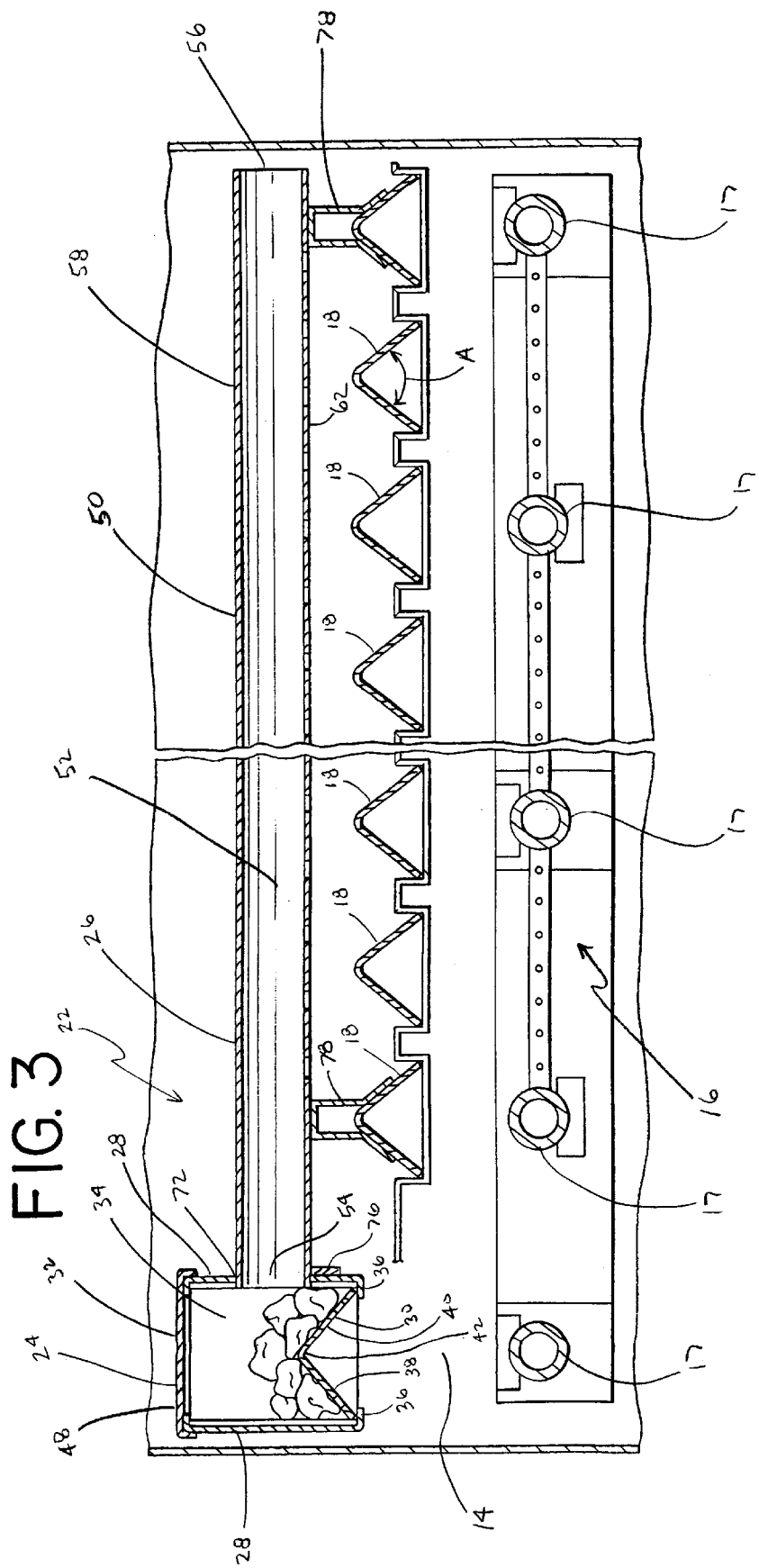

Referring now in detail to the Figures, and specifically to FIGS. 1–3, there is shown a gas barbecue grill 10 as disclosed in U.S. Pat. Nos. 5,765,469 and, 5,934,183 assigned to the Assignee of the present invention, and incorporated herein by reference. The barbecue grill 10 generally includes a rectangular frame work 12 and a cooking vessel 14 supported on the frame 12. The cooking vessel 14 has a heat source assembly 16 comprised of a plurality of gas burners 17, an intermediate conductor assembly 18, and an upper cooking grid 20. In the preferred embodiment of the barbecue grill 10, the intermediate conductor assembly 18 comprises a plurality of inverted "V"-shaped sear bars that cause evaporation of greases that fall from the food on the cooking grid 20. As such, each sear bar 18 generally comprises a pair of inclined walls that define an included angle A to produce the desire function of the sear bars. The inverted "V"-shaped sear bars 18 are preferably formed from a metal material having good heat conducting characteristics, such as cold-rolled steel, which has a porcelain enamel coating thereon. Because of the inverted "V"-shaped nature of the sear bars 18, and the fact that they are formed of metal which has good heat conduction, the heat from the heat source assembly 16 will be trapped between the sidewalls of the sear bar 18 and will quickly heat the entire sear bar 18 to an elevated temperature. In the embodiment illustrated in FIGS. 2 and 3, the gas burners 17 traverse from the front of the cooking vessel 14 to the rear of the cooking vessel, and the sear bars 18 similarly traverse from the front of the cooking vessel 14 to the rear of the cooking vessel. The specific orientation of the gas burners 17 in the cooking chamber 14 is not critical, however, it is important that the sear bars 18 are positioned above a substantial length of the gas burners 17 to allow for effective heating of the smoker particles in the smoker container 24. As shown in FIG. 3, when space exists between the sear bars 18 situated over the burners 17, additional sear bars 18 may be positioned between such sear bars 18 to provide conductive members 18 in this area.

According to the present invention, the smoker attachment 22 is equipped for the barbecue grill 10 in order to assist in providing a desired flavor to the food being cooked on the barbecue grill 10. The smoker attachment 22 of the present invention is illustrated in FIGS. 1–3, and generally comprises a container or receptacle 24 for containing the smoker particles, and a duct member 26. In the preferred embodiment, two duct members 26 are utilized to more throughly distribute the smoke generated in the container 24. The duct members 26 associate with the interior cavity 34 of the container 24 to allow smoke produced in the container to flow out of the container and into the duct member 26 for distribution into the chamber 14 of the grill 10.

As seen in FIG. 3, the container 24 of the smoker attachment 22 is located adjacent to, and in the same general direction as the heat source 16 of the barbecue grill 10. This provides for more rapid and efficient heating of the smoker particles in the smoker since approximately the entirety of the length of the smoker attachment 22 is directly above the heat source 16. For use of the smoker attachment 22 in the identified grill 10, one of the sear bars 18 located above one of the gas burners 17 is removed, and the container 24 of the smoker assembly 22 is located in its place. While more thoroughly explained in the '469 and '183 patents incorporated herein by reference, the grill 10 utilized in conjunction with the smoker 22 of the present invention has burners 17 which can be independently controlled. Thus, since the smoker assembly 22 is situated adjacent to one of the burners 17 of the grill 10, the smoker assembly 22 may be selectively heated by independent control of the specific burner 17 adjacent the smoker assembly 22. Accordingly, the smoker assembly 22 of the present invention can be utilized in conjunction with a gas grilling process, whereby a plurality of gas burners 17 are ignited, including the designated burner 17 for the smoker assembly 22, or the smoker assembly 22 can convert a traditional gas grill 10 into a smoker unit by igniting only the burner 17 adjacent the smoker assembly 22.

The container 24 of the present invention has a plurality of side walls 28, a bottom wall 30, and a lid or top member 32. The interior volume of the container between the lid 32, side walls 28, and bottom wall 30 of the container 24 defines an interior cavity 34 of the container. Generally, the container 24 is manufactured by welding or otherwise securing the side walls 28 together, and then locating the bottom wall 30 on a lip 36 of two of the sidewalls 28. However, the container 24 may be made of a single piece of material. The side walls 28 of the container 24 may be manufactured of a porcelain-enamel coated steel, stainless steel, aluminum, or any other material capable of withstanding elevated temperatures. Similarly, the bottom wall 30 of the container 24 may be manufactured of any material having good conductive characteristics. As shown in FIGS. 2 and 3, the bottom wall 30 of the container 24 comprises a first portion 38 and a second portion 40 joining at an apex 42. As such, the geometric configuration of the bottom wall 30 allows for a greater amount of surface area of material of the bottom wall 30 to be in contact with the smoker particles to assist in more quickly heating the smoker particles via conductive means. In addition to the above-noted heating method, a plurality of openings 44 are located in each of the portions 38,40 of the bottom wall 30. The openings 44 provide for direct heat from the adjacent gas burner 17 to enter the interior cavity 34 of the container 24 to heat the smoker particles in the container 24.

The lid or cover 32 of the container 24 is hingedly connected to the side walls 28 of the container 24 by a pair of pivot pins 46, however, the lid 32 is also removable from the container 24. In an open position, the lid 32 provides access to the cavity 34 of the container 24 for inserting additional smoker chips. The flat upper surface 48 of the lid 32 may have a plurality of apertures (not shown) therein for allowing smoke generated from the heated smoker particles to escape out of the container 24 (through the apertures) and into the cooking vessel 14 of the grill 10. In the preferred embodiment, however, the lid 32 has no apertures. All smoke generated in the container 24 is directed into the duct members 26 for distribution thereof.

The preferred embodiment of the smoker attachment 22 utilizes two duct members 26 removably mated to the smoker container 24. The first duct member 26a is located adjacent a rear of the grill chamber 14, and the second duct member 26b is located adjacent a front of the grill chamber 14. While the duct members 26 in the preferred embodiment are removably mated or connected to the smoker container 24, they may be fixed to the container 24 without departing from the scope of the invention. As best shown in FIGS. 2 and 3, each duct member 26 comprises an elongated member having an outer shell 50 and an interior passageway or internal recess 52. The interior passageway 52 extends from an open first end 54 of the duct member 26, through the entire extended length of the duct member 26 to the second end 56 thereof. Generally, the second end 56 of the duct member 26 is closed. The duct member 26 further comprises a plurality of duct openings 64 about its length extending from the interior 52 of the duct member 26, through its outer shell 50, and to an exterior of the duct member 26. The duct openings 64 allow the smoke flowing in the duct member 26 to be dispersed within the chamber 14 of the grill 10. In the preferred embodiment, the geometric cross-sectional profile of the duct member 26 is that of a triangular shaped member. As such, the duct member 26 comprises an upper member 58 having an apex 60, and a bottom member 62 having the duct openings 64. The duct openings 64 are preferably located on the bottom member 62 to prevent the buildup of residue from the smoker particles. The upper member 58 of the duct member 26 comprises a first angled member 66 and a second angled member 68. An end of the first and second angled members 66,68 is joined at the apex 60 of the upper member 58, which is distal to and opposes the openings 64 of the duct member 26. The first and second angled members 66,68 of the upper member 58 provide the duct member 26 with an inverted "V" shaped configuration similar to the sear bars 18 of the grill. While the inverted "V" shaped configuration of the upper member 58 provides to shield the openings 64 of the bottom member 60 from food drippings that fall from the food being cooked on the cooking grid 20, this specific configuration is not necessary, and a variety of other configurations may be utilized to perform the same function.

To utilize the ducted smoker assembly 22 of the present invention with the identified grill 10, one of the sear bars 18 is removed from above a gas burner 17 and the smoker container 24 is located in its place. Next, the duct member 26 is removably mated and connected to the smoker container 24 adjacent the first end 54 of the duct member 26. Since the container 24 of the smoker assembly 22 is orientated above the gas burner 17, the duct member 26 is orientated transverse to the container 24 to provide a duct member that extends substantially from one end of the grilling chamber 14 to the opposing end of the grilling chamber 14. In order to allow the duct member 26 to mate with the smoker container 24, the container 24 has a respective aperture 72 in the side wall 28 thereof for each duct member 26. The profile of the aperture 72 is dimensioned similar to the profile of the duct member 26 to allow the duct member 26 to partially fit within the smoker container 24. Accordingly, in the preferred embodiment the aperture 72 in the container 24 has a triangular shape. With such a configuration, the open first end 54 of the duct member 26 is able to partially fit within the aperture and mate with the aperture 72 of the container 24 of the smoker assembly 22. Thus, the duct member 26 actually defines a portion of the wall of the smoker container 24. In this configuration, a gaseous path is provided from the cavity 34 of the container 24 through to the interior 52 of the duct member 26, whereby smoke is generated in the smoker container 24, the smoke then exits the smoker container 24 and traverses into and through the internal recess 52 of the duct member 26, and then exits the duct member 26 through the openings 64 to be dispersed in the grilling chamber 14 of the grill.

Each duct member 26 also has a duct stop 76 adjacent the first end 54 thereof, and at least one support member 78 spaced about the bottom member 62 of the duct member 26. The duct stop 76 is generally a piece of metal extending downward from the duct member 26 to assist in positioning the duct member 26 relative to the side wall 28 of the container 24. As shown in FIG. 3, when the passageway 52 of the duct member 26 is mated with the aperture 72 of the smoker container 24, the duct stop 76 transversely positions the duct member 26 against the side wall 28 of the container 24. The duct stop 76 may be positioned against the outside of the container 24 to prevent the duct member from being inserted too far into the container, or it may be positioned against the inside of the container to prevent the duct member from disengaging from the container. The support member 78 assists in supporting the remaining portion of the duct member 26 within the cooking vessel of the grill. As shown in FIG. 3, the support member 78 comprises an angled member connected to the bottom portion 62 of the duct member 26. The angled portion of the support member 78 is dimension to mount the elongated duct 26 on the sear bars 18 to further support the duct member.

While the specific embodiments have been illustrated and described, numerous modifications come to mind without significantly departing from the spirit of the invention, and the scope of protection is only limited by the scope of the accompanying Claims.

What is claimed is:

1. A smoker for a barbecue grill having a heat source in a cooking chamber, the smoker comprising:
   a container having a bottom wall and a plurality of side walls defining an interior cavity of the container, the container being located adjacent the heat source and being adapted to contain smoker particles in the interior cavity thereof; and,
   a duct member having a passageway extending from a first end of the duct member, the first end of the passageway of the duct member associating with the interior cavity of the container to allow smoke produced in the container to flow out of the container and into the passageway of the duct member.

2. The smoker of claim 1, wherein the duct member extends transverse to the container.

3. The smoker of claim 1, further comprising a second duct member having a passageway extending from a first end thereof, the second duct member associating with the interior cavity of the container to allow smoke produced in the container to flow out of the container and into the passageway of the second duct member.

4. The smoker of claim 1, wherein the duct member is removably connected to the container adjacent the first end of the duct member, and wherein the duct member is further supported in the cooking chamber with a support member adjacent a bottom of the duct member.

5. The smoker of claim 1, wherein the duct member has a plurality of duct openings to allow the smoke flowing in the duct member to be dispersed within the cooking chamber of the grill.

6. The smoker of claim 5, wherein the duct member comprises an upper member having an apex, and a bottom member having the duct openings, wherein the upper member shields the duct openings from food drippings.

7. The smoker of claim 1, wherein the bottom wall of the container comprises a first portion and a second portion joining at an apex.

8. The smoker of claim 1, further comprising a plurality of openings in the bottom wall of the container to allow heat to enter the container.

9. The smoker of claim 5, further comprising a lid covering the container, wherein the lid has a plurality of openings to allow smoke to be dispelled from the container.

10. A smoker attachment for a barbecue grill, comprising:

a receptacle having a cavity and an aperture in a wall thereof, the receptacle adapted to contain smoker particles in the cavity, wherein the smoker particles produce smoke when heated; and, a transversely orientated elongated duct having an interior that mates with the aperture of the receptacle to provide a gaseous path from the cavity of the receptacle through the interior of the elongated duct, the elongated duct having a plurality of openings about its length, wherein the openings extend from the interior of the elongated duct through to an exterior thereof such that the gaseous path continues out of the openings.

11. The smoker attachment of claim 10, further comprising a lid providing access to the cavity of the receptacle when in an open position.

12. The smoker attachment of claim 10, further comprising a duct stop adjacent a first end of the elongated duct, the duct stop positioning the elongated duct relative to wall of the receptacle.

13. The smoker attachment of claim 10, wherein the grill incorporates conductive members located between a heat source and a grilling surface of the grill, and further comprising a support member on the elongated duct, the support member dimensioned to mount the elongated duct on the conductive member.

14. The smoker attachment of claim 10, wherein the openings on the elongated duct are shielded from food drippings by an upper member of the elongated duct.

15. The smoker attachment of claim 14, wherein the upper member of the elongated duct comprises a first angled member and a second angled member, an end of the first and second angled members being distal the openings of the elongated duct member.

16. The smoker attachment of claim 10, wherein the elongated duct defines a portion of the wall of the receptacle.

17. A smoker attachment for a barbecue grill having a heat source in the chamber of the grill, comprising:

a smoker container adjacent the heat source, the smoker container adapted to contain smoker particles that produce smoke when heated by the heat source; and, an extended duct having an outer shell, an internal recess extending through the duct, and a plurality of openings about a length of the duct extending from the internal recess through the outer shell, the duct removably mated to the smoker container, wherein the smoke exits the smoker container, traverses through the internal recess of the duct, and exits the duct through the openings and into the chamber of the grill.

18. The smoker attachment of claim 17, further comprising a first extended duct adjacent a rear of the grill chamber, and a second extended duct adjacent a front of the grill chamber, both the first and second ducts being removably mated to the smoker container.

19. The smoker attachment of claim 17, wherein the extended duct comprises a triangular shaped member, wherein an apex of the triangular shaped member opposes the openings in the extended duct.

20. The smoker attachment of claim 17, wherein the extended duct is dimensioned to partially fit within an aperture in the smoker container.

21. The smoker attachment of claim 17, wherein the smoker container is dimensioned to depend from a shoulder in the grill chamber.

22. A smoker assembly for a barbecue grill, the grill having a bottom chamber, a cooking grid and a burner assembly comprising a plurality of burners for cooking food on the cooking grid located in the bottom chamber, the smoker assembly comprising:

a container having an interior cavity for containing smoker particles, and an opening extending from the interior cavity of the container to an exterior thereof to allow smoke produced in the container to be distributed into the chamber of the grill, wherein the container is adjacent a selected one of the plurality of burners in the bottom chamber of the grill, and wherein the smoker assembly is selectively heated by independent control of the selected one of the plurality of burners of the grill.

23. The smoker assembly of claim 22, wherein the container of the smoker assembly traverses a direction in the grill, and wherein the plurality of burners traverse the same direction in the grill chamber as the smoker assembly.

24. The smoker assembly of claim 22, further comprising a duct member having an exterior wall and a passageway extending about an interior of the duct member, the passageway of the duct member associating with the interior cavity of the container to allow smoke produced in the container to flow out of the container and into the passageway of the duct member, the duct member further having a plurality of openings extending through the exterior wall and into the passageway of the duct member to allow the smoke in the passageway of the duct member to be dispersed within the cooking chamber of the grill.

* * * * *